United States Patent [19]

Figiel et al.

[11] Patent Number: 4,636,320
[45] Date of Patent: Jan. 13, 1987

[54] PROCESS FOR REMOVAL OF SURFACE FILMS FROM NON-ABSORBENT ARTICLES

[75] Inventors: Francis J. Figiel, Boonton; Harry F. Osterman, Westfield, both of N.J.

[73] Assignee: Allied Corporation, Morris Township, Morris County, N.J.

[21] Appl. No.: 589,865

[22] Filed: Mar. 19, 1984

Related U.S. Application Data

[63] Continuation of Ser. No. 395,210, Jul. 6, 1982, abandoned, which is a continuation-in-part of Ser. No. 220,206, Dec. 24, 1980, abandoned.

[51] Int. Cl.$^4$ ............................................. B01D 17/028
[52] U.S. Cl. ................................... 210/801; 210/805; 34/9; 134/10
[58] Field of Search ............... 210/799, 801, 804, 805, 210/806, DIG. 5; 34/9, 60; 134/10, 36

[56] References Cited

U.S. PATENT DOCUMENTS

| | | | |
|---|---|---|---|
| 1,873,597 | 8/1932 | Jones | 210/799 X |
| 2,058,044 | 10/1936 | Spencer | 210/538 X |
| 3,085,948 | 4/1963 | Kearney | 202/170 |
| 3,125,106 | 3/1964 | Brucken et al. | 134/113 |
| 3,144,872 | 8/1964 | Kearney | 134/72 |
| 3,559,297 | 2/1971 | Figiel | 34/9 |
| 3,589,023 | 6/1971 | Figiel | 34/9 |
| 3,710,450 | 1/1973 | Figiel | 34/9 |
| 3,731,802 | 5/1973 | James | 210/540 X |
| 3,733,710 | 5/1973 | Kearney et al. | 34/9 |
| 4,136,217 | 1/1979 | Henley | 427/327 |
| 4,151,084 | 4/1979 | Probstein | 210/522 X |
| 4,252,649 | 2/1981 | Favret | 210/538 X |
| 4,299,665 | 11/1981 | Clay et al. | 202/204 |

FOREIGN PATENT DOCUMENTS

| | | | |
|---|---|---|---|
| 0016517 | 1/1980 | European Pat. Off. | 210/538 |
| 555806 | 7/1932 | Fed. Rep. of Germany | 210/540 |
| 2910307 | 9/1980 | Fed. Rep. of Germany | 210/540 |
| 1036679 | 7/1966 | United Kingdom | 210/705 |
| 2035118 | 6/1980 | United Kingdom | 210/540 |

Primary Examiner—David Sadowski
Attorney, Agent, or Firm—Jay P. Friedenson; Patrick L. Henry

[57] ABSTRACT

A novel apparatus and process is provided for removing with a treating fluid surface films that are hydrophilic in nature and comprises a less dense liquid component. The hydrophilic film is removed from non absorbing surfaces such as metal glass and plastics and may contain dissolved solids. The hydrophilic film is substantially immiscible in the more dense cleansing liquid. In a particular embodiment the more dense liquid is a cleansing fluid and the less dense hydrophilic component being present as a contaminant. The apparatus includes a tank (12), a separator chamber (14) and a holding chamber (16). The less dense liquid is removed from the upper part of the separator chamber 14. The configuration of separator chamber (14) effects rapid separation of overflow liquid into an upper layer of the less dense liquid and a lower layer of the more dense liquid. In another embodiment of the apparatus, a second separator chamber (89) and a second holding chamber (90) are included.

7 Claims, 7 Drawing Figures

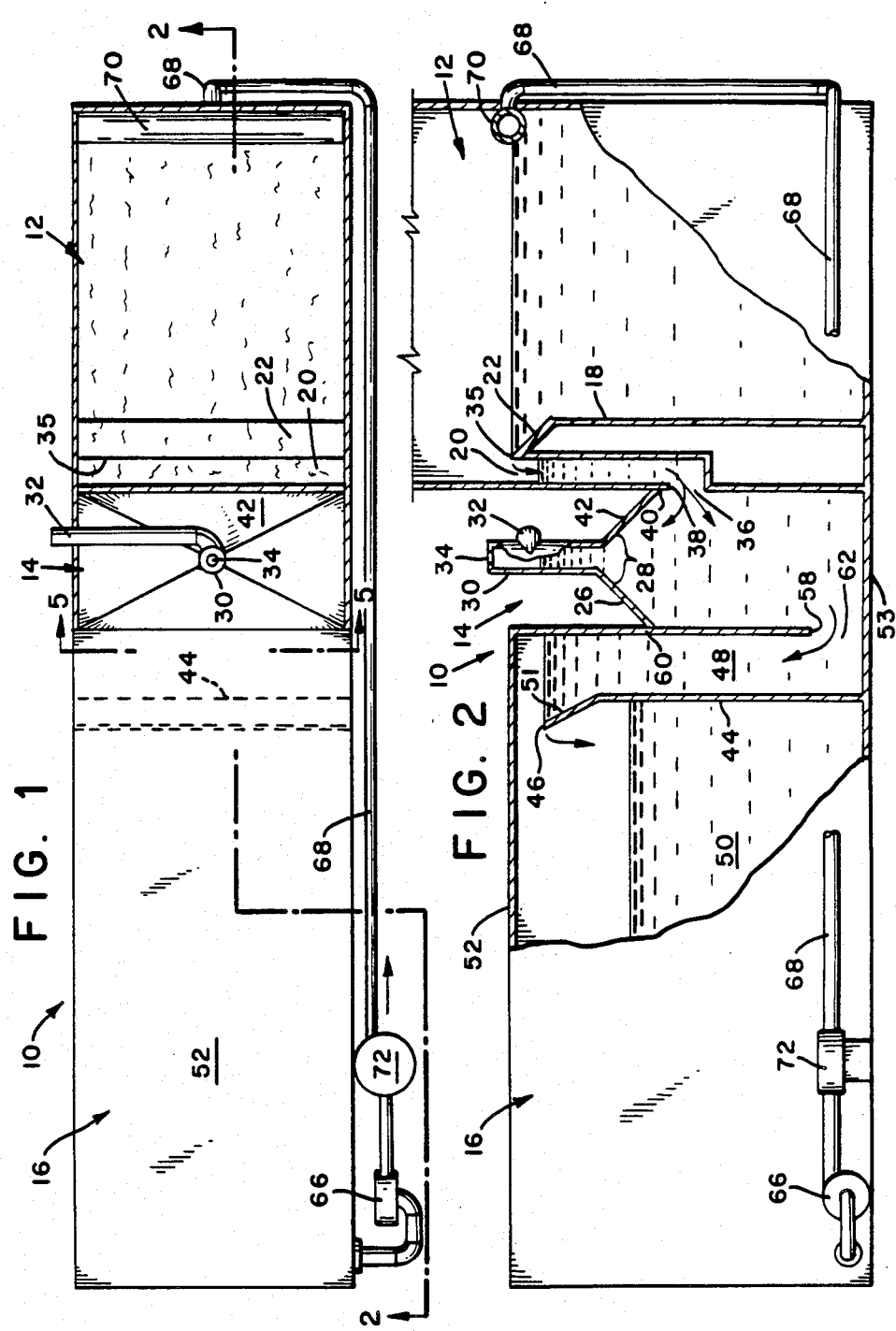

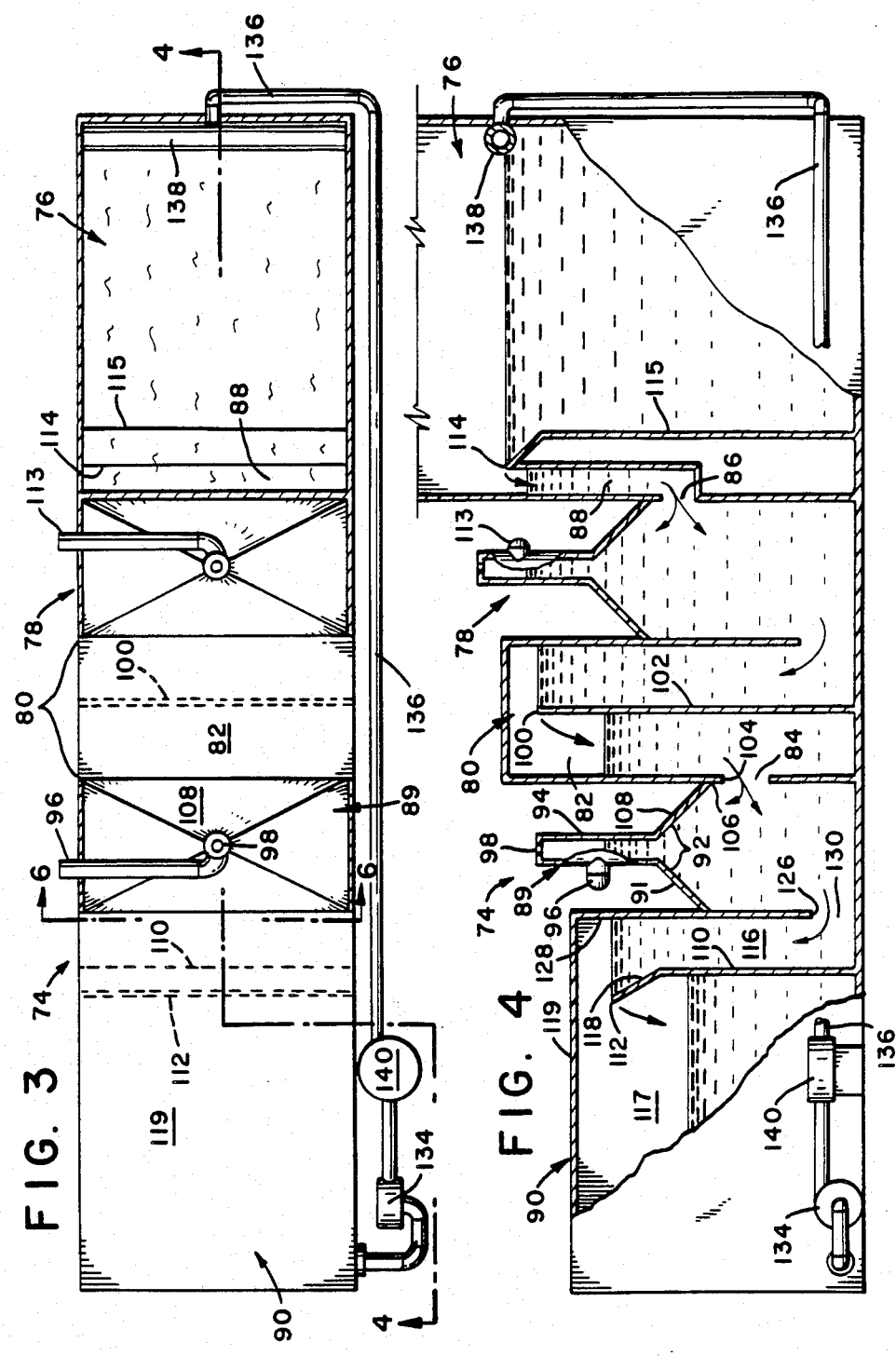

PROCESS FOR REMOVAL OF SURFACE FILMS FROM NON-ABSORBENT ARTICLES

DESCRIPTION

This application is a continuation of application Ser. No. 395,210 filed on July 6, 1982, now abandoned, which application is a Continuation-In-Part of application Ser. No. 220,206 filed on Dec. 24, 1980 now abandoned.

TECHNICAL FIELD

This invention relates to a novel apparatus and process for cleansing the surface of non absorbent articles such as metal glass and plastic using a cleansing fluid comprising a fluorocarbon and an alcohol which is miscible therewith. This cleansing fluid is a relatively more dense component. The hydrophilic or aqueous layer which is removed as a surface film from the surface of non absorbent articles and may contain salts and other substances, such as contaminants, is characterized as the less dense component. The fluorocarbon/alcohol component and the hydrophilic components are substantially immiscible in each other. Specifically, this invention relates to the use of such cleansing fluid for the removal of a hydrophilic liquid film, in which various matter including salts, contaminants, etc. both organic and inorganic are present, from non-absorbent articles.

BACKGROUND INVENTION

It is known to use a liquid mixture containing a less dense liquid component and a more dense liquid component, for the purpose of removal of water containing films and substances carried by the water film being substantially immiscible in the aforesaid cleaning fluid. Illustrative of this type of prior art are: U.S. Pat. No. 3,125,106 to Brucken et al., U.S. Pat. No. 3,559,297 to Figiel, U.S. Pat. No. 3,589,023 to Figiel, U.S. Pat. No. 3,710,450 to Figiel, U.S. Pat. No. 3,733,710 to Kearney et al., and U.S. Pat. No. 4,136,217 to Henley. The Kearney et al. patent shows separation of a liquid mixture using a conventional water separator to separate water from the more dense liquid. The Henley patent shows an overflow pipe 26 for overflowing a top portion of a liquid mixture that has an oil emulsion as the top portion and wash water as the bottom portion. The liquid overflow is allowed to reach a quiescent condition so that there is formed an oil layer and a water layer. The oil layer is removed by a conventional rotating belt oil skimmer 30.

The Figiel patents show a process in which the liquid mixture thereof is allowed to overflow from one tank into a second tank. The second tank has an overflow pipe for removing the less dense liquid, and a drainpipe for removing the more dense liquid. Drainpipe 7 in Figiel, U.S. Pat. No. 3,710,450 runs upwardly and parallel to wall 8 before turning to empty into reservoir 9. The height of drainpipe 7 determines the level of solvent in water separating pump 4. Overflow pipe 6 is connected to the water separating pump at a point slightly above the level of drainpipe 7.

This prior art and the other prior art of which we are aware fails to provide a practical apparatus or process or a cleansing system which lends itself to an operation in which non absorbent articles may be cleansed while the cleansing fluid containing the hydrophilic liquid phase, that has been removed from the non absorbent articles, is continuously processed to separate therefrom this hydrophilic phase and any contaminants removed from the surface of the articles. The cleansing fluid which is characterized as the more dense component is itself comprised of a less dense liquid, e.g., an aliphatic alcohol, and a more dense liquid e.g., trichlorotrifluoroethane. This less dense liquid present in the cleansing liquid is miscible in the more dense liquid in amounts of from 0.1% to about 10%. However, the hydrophilic film cleansed from the surface of the non absorbent articles is not miscible with cleansing fluid in amounts greater than about 0.1% by weight. This property of the cleansing fluid provides surface wetting of non absorbent articles and facilitates separation of the hydrophilic film from the surfaces of the non absorbent articles to be cleaned and thereafter separation from the more dense cleansing fluid of this hydrophilic phase. Rapid removal of this hydrophilic liquid and contained contaminants are important since this minimizes dissolution of same in the dense liquid and retains the efficiency of the cleansing system.

DISCLOSURE OF THE INVENTION

It is accordingly one object of the present invention to provide a novel apparatus, process and cleansing fluid system for the removal of a hydrophilic film from the surface of non absorbent articles that provides for rapid separation of the liquid mixture, containing the entrained hydrophilic film, into an upper layer of the less dense liquid which matter, removed from the surface of the treated non absorbent articles, and a lower layer of the more dense cleansing liquid.

Additional objects, advantages and novel features of the invention will be set forth in the description which follows, and in part, will become apparent to those skilled in the art upon examination of the following, or may be learned by practice of the invention. The objects and advantages of the invention may be realized and attained by means of instrumenttalities and combinations particularly pointed out in the appended claims.

To achieve the foregoing objects and in accordance with the purpose of the invention, as embodied and broadly described herein, the present invention is directed to an apparatus for treating a cleansing fluid into which non absorbent articles are introduced, to remove from said articles a surface hydrophilic film which may contain a variety of constituents such as salts, contaminants, etc. some of which constituents may comprise valuable substances which it is desired to recover. The aqueous film removed from the surface of the non absorbent articles comprise a fluid which is less dense than the relatively more dense cleaning fluid and is substantially immiscible in the cleansing fluid, i.e., being miscible in amounts not in excess of about 0.01% to about 1.0% by weight. The apparatus of the invention is uniquely adapted to continuously separate and remove even relatively small amounts of the less dense liquid from the more dense liquid to maintain the superior cleansing ability of the latter. In a preferred embodiment of the invention, the less dense aqueous phase, which is formed as the more dense cleansing fluid washes or otherwise removes the film from the non absorbent article to be treated, is present as a contaminant.

As used herein, the term "less dense liquid" or "less dense fluid" connotes the phase formed when the film is removed from the non absorbent articles as when such articles are cleansed of a water film and contemplates also any hydrophilic film which may contain salts, contaminants or other matter which it is desired to separate.

The term "contaminated" cleansing fluid or liquid indicates the presence of a hydrophilic or aqueous phase and may include salts, contaminants or other matter dispersed in said phase.

In one embodiment, the apparatus includes a tank, a separator chamber and a holding chamber. The tank, in which the non absorbent articles to be cleansed are introduced, has a weir of preselected height that separates the tank from an overflow channel leading to the separator chamber. The separator chamber downstream of the tank has an upper portion that leads to a fluid-exit channel from which the less dense fluid containing contaminants is removed. The fluid-exit channel is situated at a height just below an upper edge of the weir in the tank in which the articles are introduced for cleaning.

The holding chamber downstream of the separator chamber has therein a chamber-partitioning weir having an upper lip that is at a height slightly below the separator chamber fluid-exit channel. The chamber-partitioning weir in the holding chamber partitions the holding chamber into a first subchamber and a second subchamber.

The separator chamber is positioned between and is adapted to be in fluid communication with, the overflow channel from the tank and the first subchamber of the holding chamber. A bottom portion of the apparatus, a portion of each of the sides of the apparatus and a lower end of a wall dividing the separator chamber from the holding chamber, form an underflow channel through which the cleansing fluid flows. The cross-sectional area of the underflow channel is sufficiently greater that the cross-sectional area of an outlet of the overflow channel from the tank in which articles are cleansed so that pressure build-up is avoided in the event of a surge of the fluid through the apparatus.

In another preferred embodiment, the apparatus includes the tank, separator chamber, and holding chamber described above, and additionally includes another separator chamber and another holding chamber. The second separator chamber has an upper portion leading to a second fluid-exit channel from which the less dense hydrophilic fluid is removed. The second fluid-exit channel is situated at a height below the upper lip of the upstream holding chamber-partitioning weir.

The second holding chamber has therein a chamber-dividing partition having an upper lip that is at a height slightly below the second fluid-exit channel. The chamber-dividing partition divides the second holding chamber into a first subcompartment and a second subcompartment.

The second separator chamber is positioned between, and is adapted to be in fluid communication with, the second subchamber of the upstream holding chamber and the first subchamber of the second holding chamber. The second subchamber serves as a second overflow channel, and the second overflow channel has an outlet that is located at a height below the outlet of the first overflow channel. A bottom portion of the apparatus, a portion of each of the sides of the apparatus and a lower end of a wall dividing the second separator chamber from the second holding chamber, form a second underflow channel. The cross-sectional area of the second underflow channel is sufficiently greater than the cross-sectional area of the outlet of the second overflow channel so that pressure build-up is avoided in the event of a surge of the fluid through the apparatus.

In another preferred embodiment, the apparatus includes the tank, separator chamber, and holding chamber described above, and, additionally, includes another separator chamber and another holding chamber. The second separtor chamber has an upper portion leading to a second fluid-exit channel from which the less hydrophilic fluid is removed. The second fluid-exit channel is situated at a height below the upper lip of the upstream holding chamber-partitioning weir.

The second holding chamber has therein a chamber-dividing partition having an upper lip that is at a height slightly below the second fluid-exit channel. The chamber-dividing partition divides the second holding chamber into a first subcompartment and a second subcompartment.

The second separator chamber is positioned between, and is adapted to be in fluid communication with, the second subchamber of the upstream holding chamber and the first subchamber of the second holding chamber. The second subchamber serves as a second overflow channel, and the second overflow channel has an outlet that is located at a height below the outlet of the first overflow channel. A bottom portion of the apparatus, a portion of each of the sides of the apparatus and a lower end of a wall dividing the second separator chamber from the second holding chamber, form a second underflow channel. The cross-sectional area of the second underflow channel is sufficiently greater than the cross-sectional area of the outlet of the second overflow channel so that pressure build-up is avoided in the event of a surge of the fluid through the apparatus.

Also provided is a process for removing contaminants from the surface of non-absorbing articles such as metal, glass and plastics while treating the more dense cleansing fluid to eliminate build up of the less dense hydrophilic liquid component in the system. Because the components are substantially immiscible in each other, i.e., amounts of from about 0.01% to about 1.0% by wieght of the hydrophilic fluids miscible in the cleansing fluid, the system is devised to remove even small amounts of accumulation of the less dense hydrophilic film which may contain other matter such as contaminants. The process includes the steps of immersing the article to be cleansed in a tank containing the fluid, the fluid circulated into the cleaning tank is channeled so that it flows over a weir of preselected height which separates the tank from an overflow channel leading to a separator chamber. The separator chamber is provided at the upper part with an exit channel which separates and removes from the cleansing fluid the hydrophilic layer. Optionally, supplementary phase enhancement means such as an upper cone or V-shaped portion that converges at the top and leads from the separator chamber to the exit channel may be used to enhance the removal of the less dense fluid component. Separation is effected by (a) channeling the overflow liquid from the overflow channel into the separator chamber preferably at an intermediate height in the separator chamber, separating the fluid into an upper layer of the hydrophilic (less dense) layer and a lower layer of the more dense liquid and facilitates the removal of the less dense layer which may contain other matter such as salts or contaminants through the exit channel in the upper part of the separator chamber. The lower portion of the overflow liquid passing into the separator chamber is drawn lower still, with minimum turbulence or mixing, into a holding chamber having therein a chamber-partitioning weir. The lower portion of the layered overflow passing into the separator chamber is passed through an underflow channel; this underflow liquid passes over the chamber-partitioning weir of the holding chamber which functions to further minimize turbulence into a second subchamber of the holding chamber that may function as a resevoir to feed the cleansing tank.

In order to effect maximum separation of even a small less dense phase from the system, the fluid-exit channel in the separator chamber from which the less dense aqueous phase is removed is situated at a height below an upper edge of the weir separating the tank from the overflow channel. The chamber-partitioning weir in the holding chamber has an upper lip that is preferably at a height slightly below the less dense fluid-exit channel.

In another preferred embodiment, the process includes the steps set forth above and further includes the steps of removing from the purified overflow liquid, which contains the more dense cleansing liquid and any unseparated less dense contaminant containing liquid, at least a portion of such unseparated contaminant liquid by (a) chaneling the overflow liquid, substantially free of contaminant, from the second subchamber, which serves as a second overflow channel, into a second separator chamber, an upper portion of which leads to a second less dense fluid-exit channel, whereby again even a small phase of this less dense liquid still present is further separated into an upper layer of any unseparated less dense contaminant liquid and a lower layer of the more dense cleansing liquid and removed. The lower portion of the overflow cleansing liquid from the second separator chamber is channeled through a second underflow channel into a second holding chamber having therein a chamber-dividing partition over which the underflowing cleansing liquid is passed into a second subcompartment of this second separator chamber to provide a less contaminated cleansing liquid.

The fluid-exit channel in the second separator chamber for withdrawing the less dense hydrophilic phase is situated at a height below the upper lip of the chamber-partitioning weir of the upstream holding chamber. While the chamber dividing partition of the downstream holding chamber has an upper border that is at a height slightly below the fluid-exit channel in the second separator chamber, the partition in the second or downstream holding chamber, divides the second holding chamber into a first subcompartment and the second subcompartment. The second underflow channel is formed by a bottom portion of the apparatus, a portion of each of the sides of the apparatus and a lower end of the wall which divides the second separator chamber from the second holding chamber. The cross-sectional area of the second underflow channel is sufficiently greater than the cross-sectional area of an outlet of the second overflow channel so that pressure build-up is avoided in the event of a surge of the fluid through the apparatus. The outlet of the second overflow channel is located at a height below the outlet of the first overflow channel.

BRIEF DESCRIPTION OF THE DRAWING

Reference is hereby made to the accompanying drawing which forms a part of the specification of this application.

FIG. 1 of the drawing is a plan view of a preferred embodiment of the invention, showing an apparatus having one separator chamber.

FIG. 2 is a cross-sectional view of the apparatus shown in FIG. 1, taken along the line 2—2 of FIG. 1.

FIG. 3 is a plan view of another preferred embodiment of te invention, showing an apparatus having two separator chambers.

FIG. 4 is a cross-sectional view of the apparatus shown in FIG. 3, taken along the line 4—4 in FIG. 3.

BEST MODE FOR CARRYING OUT THE INVENTION

Figure 5:
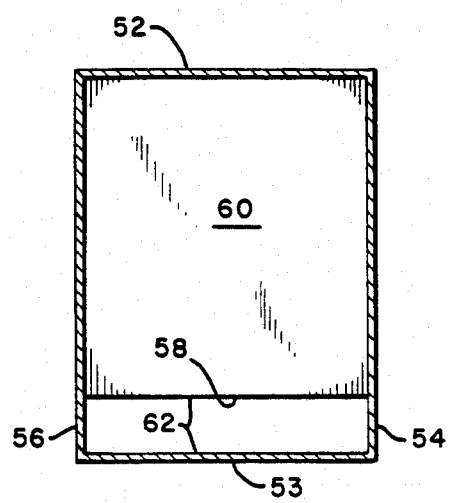
FIG. 5 is a partial cross-sectional view of the apparatus shown in FIG. 1, taken along the line 5—5 of FIG. 1. This figure shows the front view of underflow channel 62, which is shown by an end view in FIG. 2.

As explained above, in accordance with the invention, there is provided a novel apparatus and process for removal of an aqueous film which may contain salts, contaminants and other substances from the surface of non absorbent articles such as metal, glass and plastic, and for regenerating, i.e., removing from the cleansing fluid, the hydrophilic film and any contained substances that are removed from the surface of articles that are treated in the tank with the more dense liquid component. The fluid components, comprising the less dense liquid derived from the film that is removed from the surface of the non absorbent articles to be cleansed and the more dense cleansing liquid, are substantially immiscible in each other, i.e., the less dense liquid component may be soluble in the more dense cleansing liquid in amounts of from about 0.01% to about 1.0% by weight and contains the contaminants, i.e., the water and other substances to be separated.

Referring to FIGS. 1 and 2, a preferred embodiment of an apparatus 10, in accordance with the present invention, is provided that includes a tank 12, a separator chamber 14 and a holding chamber 16. Tank 12 has a weir 18 of preselected height that separates the tank from an overflow channel 20, which leads to separator chamber 14. Preferably, an upper part 22 of weir 18 is sloped in the direction of overflow channel 20 in order to provide good sweeping action for separation of contaminants introduced into tank 12 from the surface of non absorbent substrates immersed therein.

Tank 12 is illustratively used for cleaning work pieces by immersing the work pieces in the solvent contained therein. Although it will be apparent that means other than immersing, such as spraying the article, may be used to separate the hydrophilic film from the non absorbent article. The solvent is, for example, at room temperature, and is illustratively a halogenated solvent such as an azeotrope of trichlorotrifluoroethane with isopropanol, nitromethane, and/or ethanol, or an azeotrope of trichlorotrifluoroethane and methylene chloride. This solvent comprises the more dense component, i.e., the cleansing fluid which may also be an azeotrope of trichloromonofluoromethane with any of, or a mixture with, isopropanol, ethanol, methylene chloride and nitromethane. The specific cleansing liquid of the invention comprises a homogeneous liquid mixture of an organic liquid containing at least one essential non-polar halogenated hydrocarbon solvent which boils between about 20° and about 100° C. and has a density greater than about 1.3 g/cm³ at 20° C. and at least one non-halogenated organic liquid, preferably an alcohol, which is miscible with the halogenated hydrocarbon component and with water and which boils between about 20° C. and about 150° C. and has a density less than about 1.09 g/cm³ at 20° C.

In a preferred liquid mixture, the homogeneous liquid comprises at least two components wherein the essentially non-polar component constitutes about 50–99.5 weight percent of the mixture. Such non-polar component is preferably a member of the group essentially of 1,1,2 trichloro-1,2,2-trifluoroethane, trichlorofluoromethane and tetrachlorodifluoroethane and wherein the water miscible component is selected from the group consisting of aliphatic alcohols of 1–6 carbon atoms, e.g., methanol, ethanol, n-propanol isopropanol and the like, acetonitrile, acetone, nitromethane and hexane. Illustrative preferred compositions are those in which about 90 to 98 weight percent comprise 1,1,2 trichloro-1,2,2-trifluoroethane, and a homogeneous composition comprising the constant boiling mixture of about 93.5 weight percent of 1,1,2 trichloro-1,2,2-trifluoroethane, 5.5 weight percent of an aliphatic alcohol of 1–6 carbon atoms and 1.0 weight percent of nitromethane or a 98 weight percent trichlorofluoromethane with 1.5 weight percent of an aliphatic alcohol of 1–6 carbon atoms and 0.5 weight percent of nitromethane.

The separator chamber 14 is provided with a suitable exit channel 32 in the upper part of the separator chamber 14 to remove the less dense fluid. A typical arrangement using a V-shaped opening may be employed, as one optional means to concentrate the less dense components in a more restricted area contiguous to the exit channel 32 to increase the depth of the less dense liquid and thereby enhance the removal of this hydrophilic phase which may contain substances, in addition to water, that are to be separated and removed. As shown, chamber 14 has an arrangement for this purpose, comprising an upper portion 26 that converges in a V-shaped opening 28 leading to a riser tube 30. The riser tube has a fluid-exit channel 32 and is suitably provided with an air lock-preventing vent 34. The exit channel 32 is situated at a height below an upper edge 35 of weir 18. Vent 34 is located at a height above fluid-exit channel 32.

Figure 7:
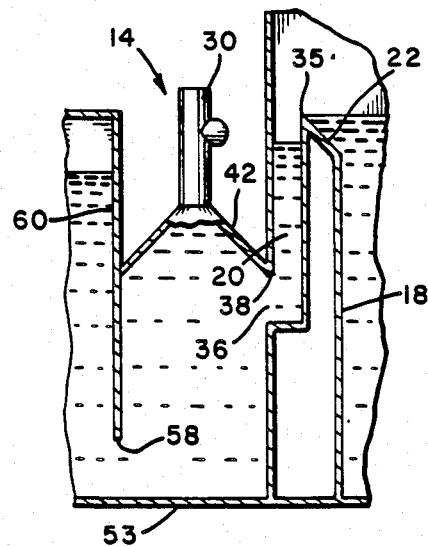
FIG. 7 shows an alternate embodiment of a portion of the apparatus shown in FIG. 2.

Overflow channel 20 has an outlet 36 that has an upper edge 38. Preferably, upper edge 38 is below a point 40 at which a side 42 of upper portion 26 begins converging toward riser tube 30. Side 42 is the side of upper portion 26 closest to tank 12. Alternatively, the point at which side 42 begins converging toward riser tube 30 could coincide with upper edge 38, as shown in FIG. 7. The embodiment of this aspect of the apparatus, described above, is intended to minimize the creation of turbulence in the area of V-shaped opening 28, minimize intermixing of the less dense and more dense liquid components, and promotes better separation of the less dense hydrophilic component and the more dense liquid component. However, it will be apparent that the invention is not limited to any specific exit channel detail.

The configuration of separator chamber 14 is devised to facilitate separation of the fluid stream entering chamber 14, at an intermediate level in the chamber, into an upper layer of the less dense liquid and a lower layer of the more dense liquid. The withdrawal of the supernatant less dense component may be aided by effecting a restriction in the cross-sectional area of the interface between the upper and lower layers. A riser tube 30 to which the V-shaped opening leads, may be used to aid in the removal of the upper layer since a relatively small amount of the less dense hydrophilic liquid provides a relatively larger depth, e.g., a layer several inches (about 7–9 centimeters) deep in riser tube 30. The less dense liquid comprising the layer to be removed, e.g., is withdrawn from the apparatus through exit channel 32.

Holding chamber 16 has a weir 44 having an upper lip 46 that is at a height slightly below exit channel 32. The height difference depends, for example, upon the specific gravity of the liquids involved. If, for instance, the immiscible liquids are an aqueous layer and a halogenated solvent such as fluorocarbon, upper lip 46 is minimally about one half inch (1.3 centimeter) below exit channel 32. Weir 44 partitions holding chamber 16 into a subchamber 48 and a subchamber 50. Preferably, an upper part 51 of weir 44 is sloped in the direction of subchamber 50 in order to provide good sweeping action. Holding chamber 16 preferably has a top portion 52, i.e., a closure, so that loss of treated fluid contained therein, into air surrounding holding chamber 16 is prevented. As shown in the drawing, the configuration of the apparatus prevents solvent vapor loss except in the vicinity of tank 12 where access for articles to be treated is provided. Loss of vapors of the more dense solvent is negligible through vent 34 since the aperture of the vent is relatively small and since the less dense liquid component is situated between the more dense liquid component and vent 34.

Referring to FIG. 5, a bottom portion 53, a side portion 54, a side portion 56 (each of apparatus 10) and a lower end 58 of a wall 60 form an underflow channel 62. Wall 60 divides separator chamber 14 from holding chamber 16. The cross-sectional area of channel 62 is sufficiently greater than the cross-sectional area of outlet 36 of overflow channel 20 so that pressure build-up and consequential generation of turbulence and intermixing of the less dense and more dense components is avoided in the event of surge of fluid through apparatus 10.

Preferably, apparatus 10 includes a pump 66 for returning the treated fluid from subchamber 50 to tank 12. Pump 66 communicates with subchamber 50 and tank 12 through line 68, which exits in a sparger 70. Line 68 preferably further includes a filter 72 for removing any unseparated insoluble contaminants from the treated fluid prior to recycling to tank 12. Filter 72 is conveniently located between pump 66 and sparger 70.

Referring to FIGS. 3 and 4, another preferred embodiment of an apparatus 74, in accordance with the present invention, is provided that is characterized by the presence of two separator chambers and two holding chambers. Whether this apparatus or that described with reference to FIGS. 1 and 2 is used to remove the hydrophilic phase, depends upon factors such as the ease of separating the less dense hydrophilic (phase) component from the more dense liquid component. For example, if separation is not difficult, the apparatus of FIGS. 1 and 2 is satisfactory. However, where the separation is relatively difficult, an apparatus using multiple effect capability in which more than one separator and holding chambers of the kind shown in FIG. 1, may be used. In situations where extremely difficult separation is involved, an apparatus in accordance with the present invention could have three or more separator chambers whereby the hydrophilic phase is separated in sequential increments.

Apparatus 74 has a tank 76, a separator chamber 78, and a holding chamber 80 function in a manner similar to tank 12, separator chamber 14 and holding chamber 16, described with reference to FIG. 1 and 2 except that subchamber 82 of holding chamber 80 serves as an overchannel which feeds a downstream second separator 89. Overflow channel 82 has an outlet 84 that is located at a height below outlet 86 of overflow channel 88.

In addition to tank 76, separator chamber 78 and holding chamber 80, apparatus 74 includes separator chamber 89 and holding chamber 90. The separator chamber 89 is provided with a fluid-exit channel from which the less dense contaminated fluid is removed. As with the embodiment of FIGS. 1 and 2, that of FIGS. 3 and 4 may comprise a separator chamber 89 provided with means to concentrate the depth of less dense layer to be removed. As shown, the top of chamber 89 is formed to have an upper portion 91 that converges in a V-shaped opening 92 that leads to a riser tube 94. Riser tube 94 has a fluid-exit channel 96 and an air lock-preventing vent 98. Exit channel 96 is situated at a height below an upper lip 100 of a weir 102. Vent 98 is located at a height above exit channel 96.

The upper edge 104 of outlet 84 of overflow channel 82 is below a point 106 at which a side 108 of upper portion 91 begins converging toward riser tube 94. Side 108 is the side closest to holding chamber 80. Alternatively, the point at which side 108 begins converging toward riser tube 94 could coincide with upper edge 104, in the same way as shown in FIG. 7 for the apparatus of FIGS. 1 and 2. The details in this embodiment of the apparatus advantageously provides laminar flow, reduces turbulence in the system throughout, and, in particular, contiguous to the exit channels, to promote better separation of the less dense liquid aqueous component from the more dense liquid component.

Holding chamber 90 has therein a partition 110 having an upper lip 112 that is at a height slightly below exit channel 96. The relative height of upper lip 112 and exit channel 96 is the same as that described above for upper lip 46 and exit channel 32 in FIG. 2. As can be seen from this description, the apparatus is provided with a configuration that promotes a downstream flow of the fluid stream exiting tank 76. Specifically, a fluid-exit channel 113 of separator chamber 78 is below an upper edge 114 of weir 115 of tank 76, upper lip 100 of weir 102 is slightly below exit channel 113, exit channel 96 is below upper lip 100, and upper lip 112 is slightly below exit channel 96. Also, overflow channel 82 has an outlet 84 that is located at a height below outlet 86 of overflow channel 88.

Partition 110 of holding chamber 90 divides chamber 90 into subcompartment 116 and subcompartment 117.

An upper part 118 of partition 110 is preferably sloped in the direction of subcompartment 117. Holding chamber 90 preferably has a top closure portion 119 for preventing loss of treated fluid contained therein into air surrounding chamber 90. As can be seen from FIG. 4, vapors of the more dense liquid component are subject to loss into the surrounding air only in the vicinity of tank 76 where access for articles to be processed is provided.

Figure 6:
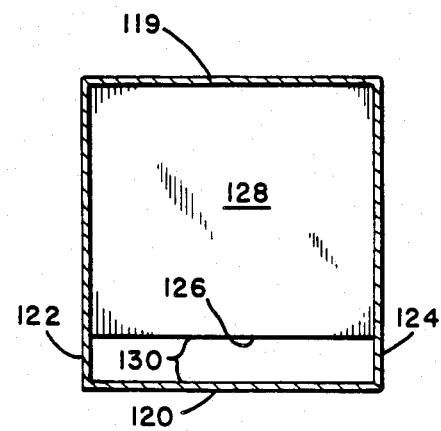
FIG. 6 is a partial cross-sectional view of the apparatus of FIG. 3, taken along the line 6—6 of FIG. 3. This figure shows the front view of underflow channel 130 which is shown by an end view in FIG. 4.

Referring to FIG. 6, a bottom portion 120, a side portion 122, a side portion 124 (each of apparatus 74), and a lower end 126 of a wall 128 form an underflow channel 130. Wall 128 divides separator chamber 89 from holding chamber 90. The cross-sectional area of underflow channel 130 is sufficiently greater that the cross-sectional area of outlet 84 of overflow channel 82 so that pressure build-up and consequential turbulence is avoided in the event of a surge of fluid through apparatus 74.

Preferably, apparatus 74 includes a pump 134 for returning treated fluid from subcompartment 117 to tank 76. Pump 134 communicates with subcompartment 117 and tank 76 through line 136, which exits in sparger 138. Preferably, line 136 further includes a filter 140 for removing any unseparated insoluble contaminants from the treated fluid prior to recycling to tank 76. Filter 140 is conveniently located between pump 134 and sparger 138.

A process in accordance with the present invention is now described for treating a fluid comprising a relatively more dense liquid which comprises the cleaning fluid component and a less dense hydrophilic liquid component which is derived as the film removed from the surface of articles by the more dense (cleansing) liquid component such as by dipping the article into and/or spraying the article with the more dense liquid component in tank 12, and using the apparatus of FIGS. 1 and 2. The liquid components are substantially immiscible in each other, and the less dense component may be regarded as being present as a contaminant in the (more dense) cleansing liquid.

In the first step of the process, in accordance with the invention, the fluid, containing in the more dense cleansing liquid, the less dense liquid which has been formed by the film removed from the surface of the non absorbent articles cleansed in tank 12, is allowed to flow over weir 18. In the next step, the less dense liquid component is removed from the overflow liquid. Removal is achieved by channeling the overflow liquid from overflow channel 20 into a separator chamber where the upper layer is removed through exit channel 32.

In the third step, in accordance with the invention, a lower portion of the layered overflow liquid is passed from separator chamber 14 into holding chamber 16. The lower portion is passed through underflow channel 62 into subchamber 48. The underflow liquid passing at 62 is allowed to flow over weir 44 into subchamber 50 to promote a condition upstream that is conducive to a more effective separation.

Preferably, the process further includes the step of recycling of the cleaning fluid from subchamber 50 to tank 12 via sparger 70. When recycling, it is preferable to filter the recycled cleansing liquid.

In the process using the apparatus shown in FIGS. 3 and 4 the essential steps are those described above with the following additional steps. In the process of FIGS. 3 and 4, some of the less dense liquid which may not be removed in separator chamber 78 is removed by channeling the overflow cleansing liquid from subchamber 82, which serves as overflow channel 82, into separator chamber 89 where the overflow liquid is rapidly separated into an upper layer of the remaining less dense liquid and a lower layer of the more dense and the less dense liquid withdrawn through exit channel 96.

In the next sequence, the lower phase is passed from separator chamber 89 into subcompartment 116 of holding chamber 90. The lower portion is passed through underflow channel 130. In the final additional, essential step, the purified underflow liquid is allowed to flow over upper lip 112 of partition 110 into subcompartment 117 to provide an overflow liquid substantially free of impurities.

Preferably, this process includes the step of recycling the overflow liquid from subcompartment 117 to tank 76, via sparger 138. When the process includes the step of recycling, it preferably includes the step of filtering the recycled liquid to remove any particulate matter therefrom.

Work surface of pieces that have been cleaned by immersion in the cleaning solvent of tank 12 or 76 may be transferred to a vapor degreaser for final cleaning. The vapor degreaser may range from a simple vapor degreaser to a multi-stage liquid-liquid-vapor degreaser with ultrasonics. The combination of equipment providing for cleaning by immersion in a solvent followed by vapor spray treatment is particularly useful for the removal of water-based cutting oils and water films from metal, glass and plastic substrates. The system may also be used, however, to recover valuable materials present in surface films or otherwise adhered to the surface of non absorbent material.

The apparatus of the present invention is conveniently constructed of metal. Suitably, each riser tube may be a viewing glass or provided with a glass window so that the level of the interface between the upper and lower layers may be observed. Conveniently, the cross-sectional area of an underflow channel is at least about twice as great as the cross-sectional area of an outlet of the upstream overflow channel to optimize laminar flow and minimize turbulence.

While only two specific embodiments of the invention have been described with reference to specific illustrations, it is to be understood that the invention is capable of modifications or changes within the scope of the inventive concept expressed herein. It is intended that the scope of the invention be defined by the claims appended hereto. Several changes or modifications have been briefly mentioned for purpose of illustration.

INDUSTRIAL APPLICABILITY

The novel apparatus and process of this invention provide a tank adapted to contain a cleaning solvent for cleaning work pieces and provide for continuous removal from the cleaning solvent of contaminants introduced therein from the removal of surface films, and substances dissolved in such films, from the surface of the non absorbent work pieces.

The invention has been primarily described with reference to cleansing the surface of non absorbent articles. Nevertheless, it will be understood that the apparatus and process of the invention may be adapted also to recover substances collected into the less dense hydrophilic liquid. For example, valuable metal salts such as gold or silver may be removed from the surface of the article, and separated in the less dense liquid in accordance with the invention, and thereafter, such salts may be recovered by means well known to those skilled in the art.

We claim:

1. A process for separating a less dense hydrophilic liquid that is introduced into a continuously circulating relatively more dense organic liquid which is used to remove said less dense hydrophilic liquid from a surface of a non-absorbent article, which comprises:
   a. immersing a non-absorbent article, having thereon a less dense surface film, into an article treating tank containing a more dense liquid having a density greater than that of water and in which water is soluble in the more dense liquid in amounts between about 0.01% and 1.0% by weight;
   b. contacting the non-absorbent article with the more dense liquid according to step (a) and thereby removing from the article a hydrophilic aqueous surface film containing dispersed substance and comprising a less dense liquid which is separated by said more dense liquid;
   c. flowing the more dense liquid containing the less dense liquid of step (b) by overflow into a separator chamber at an intermediate height in said separator chamber below where the less dense liquid is removed from the separator chamber and permitting this mixture of less dense liquid and the more dense liquid to separate into an upper layer and a lower layer in said separating chamber;
   d. continuously withdrawing from an upper part of said separator chamber, the upper layer of less dense liquid which collects in an upper separation zone of said separator chamber;
   e. continuously transferring the more dense liquid, which is collected as the lower layer in said separator chamber and is removed from said separator chamber at a level below said intermediate height where the more dense liquid containing the less dense liquid enters the separator chamber, through a channel having a cross-sectional area greater than a second cross-sectional area provided for the flow to the said separator chamber by step "c", to avoid pressure build-up, to a holding chamber;
   f. recirculating the more dense liquid which is substantially free of the less dense liquid from the holding chamber to the article treating tank of step (a) at a rate sufficient to replace a quantity of more dense liquid used to remove the less dense liquid from the surface of the non-absorbent article; and
   g. removing the non-absorbent article from the article treating tank.

2. The process according to claim 1 in which the more dense liquid contains at least one essentially non-polar halogenated hydrocarbon component, boiling between about 20°-100° C. and having a density greater than about 1.3 g/cm³ at 20° C. and at least one non-halogenated organic liquid miscible with the halogenated hydrocarbon component and with water which boils between about 20°-150° C. and has a density less than about 1.09g/cm³ at 20° C.

3. The method according to claim in which the more dense liquid is a two or more component mixture in which the substantially non-polar halogenated hydrocarbon component constitutes between about 50–99.5 weight percent of the mixture.

4. The method according to claim 3 in which the substantially non-polar halogenated hydrocarbon is a member of the group consisting of 1,1,2 trichloro-1,2,2-trifluoroethane, trichlorofluoromethane or tetrachlorodifluoroethane and in which a water miscible component is a member of the group consisting of methanol, ethanol, n-propanol, isopropanol, acetonitrile, acetone, nitromethane and hexane.

5. The method according to claim 1, in which the more dense liquid contains a non-polar component which is 1,1,2 trichloro-1,2,2-trifluoroethane or trichlorofluoromethane, and contains a component selected from the group of aliphatic alcohols, nitromethane and methylene chloride.

6. The method according to claim 5 in which the more dense liquid is selected from the group consisting of a constant boiling mixture of about 93.5 weight percent of 1,1,2-trichloro-1,2,2-trifluoroethane, 5.5 weight percent of aliphatic alcohols and 1.0 weight percent of nitromethane and 98 weight percent of trichlorofluoromethane, 1.5 weight percent of aliphatic alcohols and 0.5 weight percent of nitromethane.

7. The method according to claim 1 in which the more dense liquid comprises between about 90–98 weight percent of 1,1,2 trichloro-1,2,2-trifluoroethane or trichlorofluoromethane.

* * * * *